(12) United States Patent
Wei et al.

(10) Patent No.: US 11,921,942 B2
(45) Date of Patent: Mar. 5, 2024

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Qibing Wei, Wuhan (CN); Peng Zhang, Wuhan (CN); Kang Yang, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 17 days.

(21) Appl. No.: 17/690,031

(22) Filed: Mar. 9, 2022

(65) Prior Publication Data
US 2023/0205335 A1    Jun. 29, 2023

(30) Foreign Application Priority Data
Dec. 27, 2021 (CN) .......................... 202111611476.5

(51) Int. Cl.
*G06F 3/041* (2006.01)
*G06F 3/044* (2006.01)
*G06F 3/047* (2006.01)

(52) U.S. Cl.
CPC .......... *G06F 3/0412* (2013.01); *G06F 3/0446* (2019.05); *G06F 3/047* (2013.01); *G06F 2203/04103* (2013.01)

(58) Field of Classification Search
CPC ............................................ G06F 2203/04112
See application file for complete search history.

(56) References Cited

U.S. PATENT DOCUMENTS

2020/0012387 A1\* 1/2020 Kim ...................... G06F 3/0443
2020/0033967 A1\* 1/2020 Yang ..................... G06F 3/0448

FOREIGN PATENT DOCUMENTS

CN         110308811 A      10/2019
CN         212515770 U       2/2021

\* cited by examiner

*Primary Examiner* — Robin J Mishler
(74) *Attorney, Agent, or Firm* — East IP P.C.

(57) ABSTRACT

Embodiments of the application provide a display panel and display device. The display panel has a display area and a non-display area and includes a touch-control component, including multiple first electrode blocks distributed in sequence along a first direction and multiple second electrode blocks distributed in sequence along a second direction, the first electrode blocks and second electrode blocks being positioned in the display area; and a dummy component including dummy electrode blocks positioned in the display area and dummy traces positioned in the non-display area, each dummy electrode block being positioned between two adjacent first electrode blocks and a second electrode block adjacent to the two adjacent first electrode blocks, wherein there is a first distance S between two adjacent dummy electrode blocks, and a distance from an end of at least one dummy trace to a dummy electrode block is greater than or equal to S/3.

19 Claims, 9 Drawing Sheets

DISPLAY PANEL AND DISPLAY DEVICE

CROSS-REFERENCE TO RELATED APPLICATIONS

This application claims the priority to Chinese patent application No. 202111611476.5 filed on Dec. 27, 2021, which is incorporated herein by reference in its entirety.

TECHNICAL FIELD

The present application relates to the field of display equipment, and particularly to a display panel and a display device.

BACKGROUND

Existing display devices usually have touch-control components. The touch-control components are usually used as input devices in the display devices. For example, in a display device, a user may input information by pressing or touching a touch-control sensor while viewing an image displayed on a screen of the display device.

In a related touch-control display panel, a touch-control component may include a touch-control electrode positioned in a display area and a touch-control trace positioned in a non-display area. The touch-control trace may be used to connect to a circuit board to transmit a touch-control signal between the circuit board and the touch-control electrode. Since touch-control traces usually extend directly from touch-control electrodes toward the circuit board, the touch-control traces are arranged unevenly in the non-display area. In order to improve uniformity of the arrangement of traces, dummy electric blocks surrounding the touch-control electrodes may also be arranged in the non-display area. Charges are prone to be accumulated on the dummy electric blocks. Service life of the touch-control electrode blocks is especially vulnerable to these charges.

SUMMARY

Embodiments of the present application provide a display panel and a display device.

An embodiment of a first aspect of the present application provides a display panel. The display panel has a display area and a non-display area. The display panel includes a touch-control component, including a plurality of first electrode blocks distributed in sequence along a first direction, and a plurality of second electrode blocks distributed in sequence along a second direction, the plurality of first electrode blocks and the plurality of second electrode blocks being positioned in the display area; and a dummy component, including dummy electrode blocks positioned in the display area and dummy traces positioned in the non-display area, each dummy electrode block being positioned between two adjacent first electrode blocks and a second electrode block adjacent to the two adjacent first electrode blocks, wherein there is a first distance S between two adjacent dummy electrode blocks, and a distance from an end of at least one of the dummy traces to a dummy electrode block is greater than or equal to S/3.

An embodiment of a second aspect of the present application provides a display device, including the display panel described above.

In the display panel provided by the embodiment of the present application, the display panel includes the touch-control component and the dummy component, and the touch-control component includes the first electrode blocks and the second electrode blocks and is configured to implement a touch-control function. The dummy electrode blocks are positioned between the first electrode blocks and the second electrode blocks to improve the capacitance generated between them, so as to improve the touch-control precision. The dummy component include the dummy traces positioned in the non-display area to improve the uniformity of the arrangement of traces in the non-display area. The distance from an end of a dummy trace to a dummy electrode block is greater than or equal to S/3, so that the distance from the dummy trace to the dummy electrode block is relatively far. As a result, when the dummy trace absorbs static electricity and discharges through its end tip, the static electricity can be prevented from being conducted to the dummy electrode block, and then the static electricity can be prevented from propagating in the display area and piercing the touch-control component, so as to improve the service life of the touch-control component. Therefore, the embodiments of the application can prevent the static electricity on the dummy traces from being conducted to the dummy electrode blocks to propagate in the display area, by increasing the distances between the dummy electrode blocks and ends of the dummy traces, so as to prolong service life of the entire touch-control component.

BRIEF DESCRIPTION OF THE DRAWINGS

Other features, objects and advantages of the present application will be apparent from the below detailed description of non-limiting embodiments described with reference to the accompanying drawings, in which the same or similar reference symbols indicate the same or similar features.

DESCRIPTIONS OF THE REFERENCE SYMBOLS ARE PROVIDED BELOW

Figure 1:
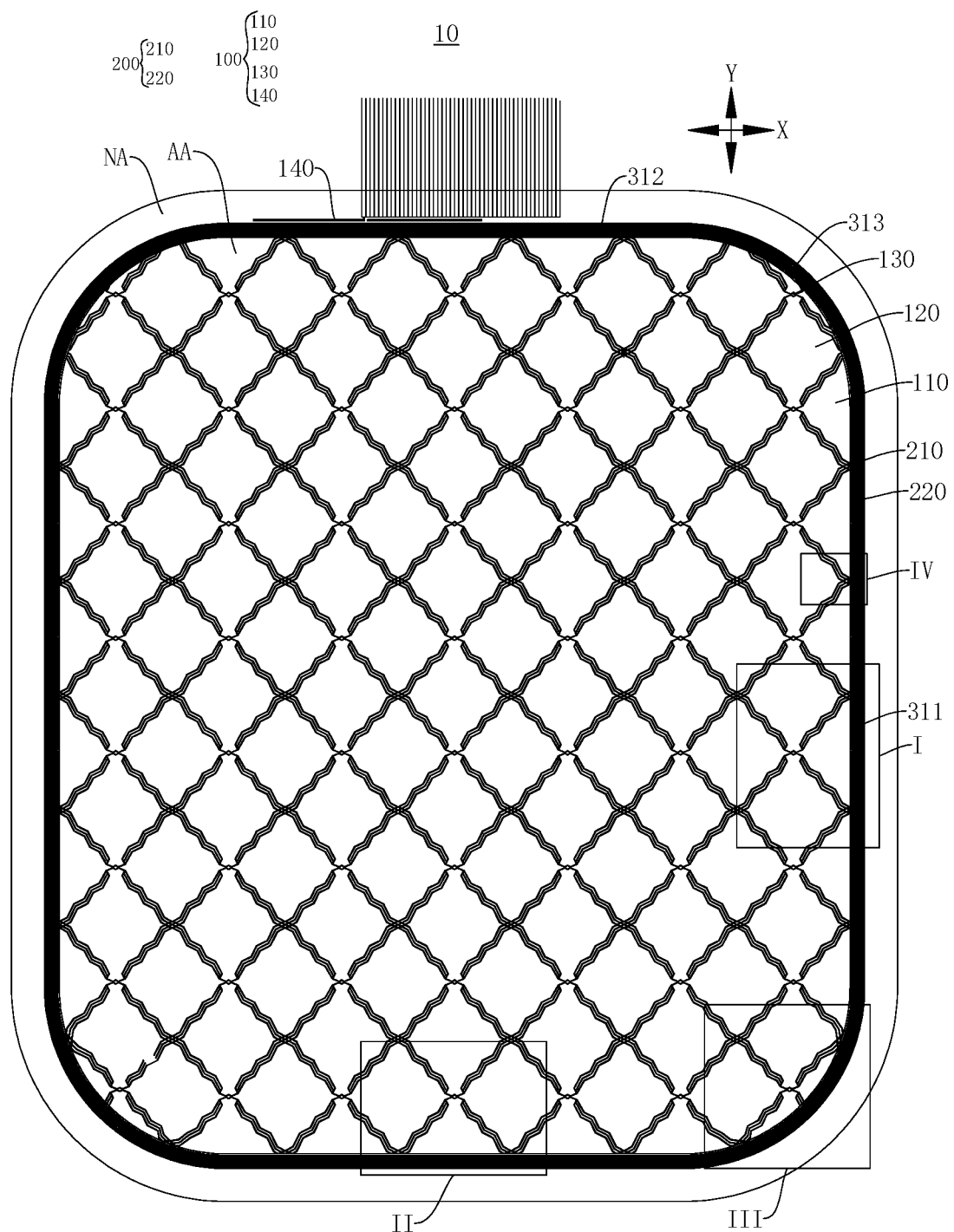
FIG. 1 is a schematic structural diagram of the display panel provided by the embodiment of the first aspect of the present application.

10. display panel;
100. touch-control component; 110. first electrode block; 120. second electrode block; 130. bridge electrode; 140. touch-control trace;
200. dummy component; 210. dummy electrode block; 210a. near-end dummy electrode block; 211. first dummy electrode block; 212. second dummy electrode block; 213. third dummy electrode block; 220. dummy trace; 221. first dummy trace; 222. second dummy trace; 223. third dummy trace;

310. first edge; 320. second edge; 330. special-shaped edge;

AA. display area; NA. non-display area

X. the first direction; and Y. the second direction.

DETAILED DESCRIPTION

Features and exemplary embodiments of various aspects of the present application will be described in details below. Many specific details are proposed in the detailed description, in order to provide a comprehensive understanding of the present application. However, it is apparent for those skilled in the art that the present application can be implemented without some of those specific details. The following description of embodiments is only for providing a better understanding of the present application by showing examples of the present application. In the accompany drawings and the following description, at least some well-known structures and techniques are not shown in order to avoid unnecessarily obscuring the present application; and, dimensions of some structures may be exaggerated for clarity. Furthermore, features, structures or characteristics described below may be combined in any suitable manner in one or more embodiments.

In the description of the application, it should be noted that, unless otherwise stated, "a plurality of" means two or more; the terms "top", "bottom", "left", "right", "inside", and "outside" used to indicate orientation or position relationships are only for purpose of facilitating the description of the application and simplifying the description, and do not indicate or imply that a device or element referred to must have a specific orientation, be constructed and operated in a specific orientation, and therefore cannot be understood as limitations to the application. In addition, the terms "first", "second" etc. are only used for descriptive purposes, and cannot be understood as indicating or implying relative importance.

The orientation words appearing in the following description are all directions shown in the figures, and do not limit the specific structure of the application. In the description of the application, it should also be noted that, unless otherwise explicitly stated and defined, the terms "installation" and "connection" should be understood in a broad sense, for example, it may be a fixed connection or a detachable connection, an integral connection; it may be a direct connection or an indirect connection through an intermediate medium. For those of ordinary skills in the art, specific meanings of the above-mentioned terms in this application may be understood according to specific circumstances.

In a related touch-control display panel, a touch-control component may include a touch-control electrode positioned in a display area and a touch-control trace positioned in a non-display area. The touch-control trace may be used to connect to a circuit board to transmit a touch-control signal between the circuit board and the touch-control electrode. Since touch-control traces usually extend directly from touch-control electrodes toward the circuit board, the touch-control traces are arranged unevenly in the non-display area. In order to improve uniformity of the arrangement of traces, dummy electric blocks surrounding the touch-control electrodes may also be arranged in the non-display area. Charges are prone to be accumulated on the dummy electric blocks.

The dummy electric blocks are usually in the form of dummy traces. The inventors found that when electrostatic charges are accumulated on the dummy traces, the electrostatic charges are especially prone to be released from ends of the dummy traces and conducted to the dummy electric blocks. As a result, the electrostatic charges are especially prone to be conducted to the display area through the dummy electric blocks in the display area, leading to breakdown of the touch-control electrodes in the display area, which will affect the service life of the touch-control components.

In order to solve the above technical problems, the present application is proposed. In order to have a better understanding of the present application, the display panel and the display device according to the embodiments of the present application will be described in details below with reference to FIGS. 1 to 9.

Figure 2:
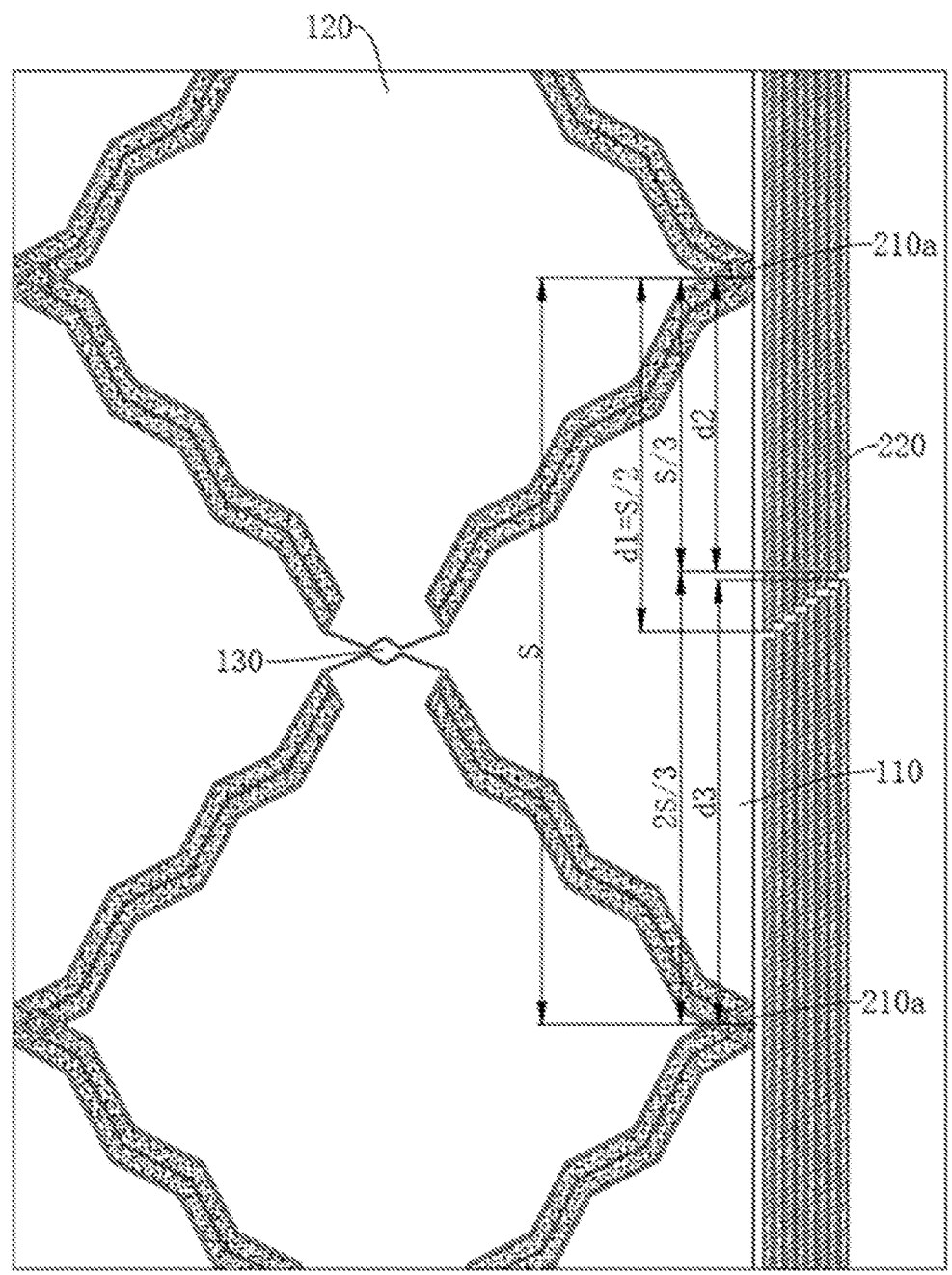
FIG. 2 is an enlarged schematic structural diagram of a portion I of FIG. 1.

Please refer to FIG. 1 and FIG. 2 jointly. FIG. 1 is a schematic structural diagram of the display panel 10 provided by the embodiment of the first aspect of the present application. FIG. 2 is an enlarged schematic structural diagram of a portion I of FIG. 1.

As shown in FIG. 1 and FIG. 2, the display panel 10 provided by the embodiment of the first aspect of the present application has a display area AA and a non-display area NA. The display panel 10 includes a touch-control component 100 and a dummy component 200. The touch-control component 100 includes a plurality of first electrode blocks 110 distributed in sequence along a first direction X and a plurality of second electrode blocks 120 distributed in sequence along a second direction Y. Both the plurality of first electrode blocks 110 and the plurality of second electrode blocks 120 are positioned in the display area AA. The dummy component 200 includes dummy electrode blocks 210 positioned in the display area AA and dummy traces 220 positioned in the non-display area NA. Each dummy electrode block 210 is positioned between two adjacent first electrode blocks 110 and a second electrode block 210 adjacent to the two adjacent first electrode blocks 110. There is a first distance S between two adjacent dummy electrode blocks 210. A distance from an end of at least one of the dummy traces 220 to a dummy electrode block 210 is greater than or equal to S/3.

In the display panel 10 provided by the embodiment of the present application, the display panel 10 includes the touch-control component 100 and the dummy component 200, and the touch-control component 100 includes the first electrode blocks 110 and the second electrode blocks 120 and is configured to implement a touch-control function. The dummy electrode blocks 210 are positioned between the first electrode blocks 110 and the second electrode blocks 120 to improve the capacitance generated between them, so as to improve the touch-control precision. The dummy component 200 include the dummy traces 220 positioned in the non-display area NA to improve the uniformity of the arrangement of traces in the non-display area NA. The distance from an end of a dummy trace 220 to a dummy electrode block 210 is greater than or equal to S/3, so that the distance from the dummy trace 220 to the dummy electrode block 210 is relatively far. As a result, when the dummy trace 220 absorbs static electricity and discharges through its end tip, the static electricity can be prevented from being conducted to the dummy electrode block 210, and then the static electricity can be prevented from propagating in the display area AA and piercing the touch-control component 100, so as to improve the service life of the touch-control component 100. Therefore, the embodiment of the application can prevent the static electricity on the dummy traces 220 from being conducted to the dummy electrode blocks 210 to propagate in the display area AA, by increasing the distances between the dummy electrode blocks 210 and ends of the dummy traces 220, so as to prolong service life of the entire touch-control component 100.

Optionally, as shown in FIG. 1, the touch-control component 100 may further include bridge electrodes 130 positioned in the display area AA and touch-control traces 140 positioned in the non-display area NA. The bridge electrodes 130 may be used to connect adjacent first electrode blocks 110 or adjacent second electrode blocks 120. In the embodiment of the present application, the bridge electrodes 130 are used to connect adjacent first electrode blocks 110 in the first direction X, which is taken as an example for description. In other embodiments, the bridge electrodes 130 may also be used to connect adjacent second electrode blocks 120 in the second direction Y.

The touch-control traces 140 may be used to connect the first electrode blocks 110 or the second electrode blocks 120, and may be configured to transmit touch-control information. FIG. 1 only shows a schematic structural diagram of a part of the touch-control traces 140. In other embodiments, the touch-control traces 140 may also be arranged in other structures, as long as the touch-control traces 140 can transmit touch-control signals.

Optionally, a distance from any dummy trace 220 to any dummy electrode block 210 in any direction may be greater than or equal to S/3. Alternatively, distances between some dummy traces 220 and some dummy electrode blocks 210 in any direction are greater than or equal to S/3. Alternatively, a distance from a dummy trace 220 to one of the dummy electrode blocks 210 in a certain direction is greater than or equal to S/3.

In some other optional embodiments, as further shown in FIG. 2, the dummy electrode blocks 210 may include near-end dummy electrode blocks 210a adjacent to an edge of the display area AA. The first distance S may be a distance between two adjacent near-end dummy electrode blocks 210a.

In these optional embodiments, the near-end dummy electrode blocks 210a are adjacent to the edge of the display area AA, so that the near-end dummy electrode blocks 210a are closer to the non-display area NA, and thus closer to the dummy traces 220 positioned in the non-display area NA. As a result, the near-end dummy electrode blocks 210a are especially vulnerable to the static electricity released from the dummy traces 220.

In the embodiments of the present application, a distance between two adjacent near-end dummy electrode blocks 210a may be taken as the first distance S, i.e., a distance from an end of at least one of the dummy traces 220 to a near-end dummy electrode block 210a is greater than one-third of the distance between the two adjacent near-end dummy electrode blocks 210a, so as to ensure a larger distance between from near-end virtual electrode blocks 210a to the virtual electrode block 210, and further to ensure a larger distance from another virtual electrode block 210 to the virtual electrode block 210. As such, the influence of the static electricity released from the dummy traces 220 on the touch-control component 100 can be further improved.

Optionally, since the near-end dummy electrode blocks 210a are adjacent to the edge of the display area, the distance between two adjacent near-end dummy electrode blocks 210a may be a distance between the two adjacent near-end dummy electrode blocks 210a in an extension direction of the edge of the display area, i.e., the first distance S may be the distance between the two adjacent near-end dummy electrode blocks 210a in the extension direction of the edge of the display area.

Optionally, in the embodiments of the present application, two adjacent near-end dummy electrode blocks 210a may be dummy electrode blocks 210 positioned at opposite sides of the same first electrode block 110 or the same second electrode block 120. Optionally, as further shown in FIG. 2, a near-end dummy electrode block 210a may include a plurality of electrode sub-blocks. Shapes of the plurality of electrode sub-blocks may be the same or different. For example, as shown in FIG. 2, shapes of the electrode sub-blocks may be triangular or rhombic, as long as the dummy electrode block 210a is adjacent to the edge of the display area and positioned between adjacent electrode blocks. The dummy electrode block 210a may be positioned between two adjacent first electrode blocks 110, the dummy electrode block 210a may be positioned between two adjacent second electrode blocks 120, or the dummy electrode block 210a may be positioned between a first electrode block 110 and a second electrode block 120 adjacent to the first electrode block 110.

Optionally, the distance between two adjacent near-end dummy electrode blocks 210a may be the minimum distance between electrode sub-blocks of the two adjacent near-end dummy electrode blocks 210a and close to each other, i.e., the minimum distance between the two adjacent near-end dummy electrode blocks 210a. Alternatively, the distance between two adjacent near-end dummy electrode blocks 210a may be the maximum distance between electrode sub-blocks of the two adjacent near-end dummy electrode blocks 210a and far away from each other, i.e., the maximum distance between the two adjacent near-end dummy electrode blocks 210a. Alternatively, the distance between two adjacent near-end dummy electrode blocks 210a may be any distance between the first distance and the second distance.

In some optional embodiments, as further shown in FIG. 2, at least a part of the dummy traces 220 and the near-end dummy electrode blocks 210a are positioned at opposite sides of the same edge of the display area AA, and a distance from an end of a dummy trace 220 to a dummy electrode block 210 positioned at opposite sides of the same edge of the display area and in an extension direction of the edge of the display area is greater than or equal to S/3.

The distance from the dummy trace 220 to the dummy electrode block 210 positioned at opposite sides of the same edge of the display area AA is closer than those between other dummy traces 220 and dummy electrode blocks 210. When the distance from the end of the dummy trace 220 to the dummy electrode block 210 positioned at opposite sides of the same edge of the display area and in the extension direction of the edge of the display area is greater than or equal to S/3, it can be ensured that an end of a dummy trace 220 closer to a dummy electrode block 210 is relatively far from the dummy electrode block 210. As such, the influence of the static electricity released from the dummy traces 220 on the touch-control component 100 can be further improved.

Optionally, as further shown in FIG. 2, the dummy traces 220 may be formed along an extension direction of an edge of the display area adjacent to the dummy traces 220, and the plurality of near-end dummy electrode blocks 210a may be distributed at intervals along an extension direction of an edge of the display area adjacent to the near-end dummy electrode blocks 210a. Among near-end dummy electrode blocks 210a and dummy traces 220 positioned at opposite sides of the same edge of the display area, when a distance from an end of a dummy trace 220 to one of the near-end dummy electrode blocks 210a is greater than or equal to S/3, a distance from the end of the dummy trace 220 to another near-end dummy electrode block 210a is less than or equal to S-S/3, i.e., the distance from the end of the dummy trace 220 to the another near-end dummy electrode block 210a is less than or equal to 2S/3. Therefore, among the near-end dummy electrode blocks 210a and dummy traces 220 positioned at opposite sides of the same edge of the display area, a distance from an end of a dummy trace 220 to a near-end dummy electrode block 210a ranges from S/3 to 2S/3.

In some optional embodiments, as further shown in FIG. 2, the dummy traces 220 may include a plurality of dummy traces 220 that are arranged side by side in a direction away from the display area AA, and a distance d1 between an end of the one of the plurality of dummy traces next to the display area AA and a near-end dummy electrode block 210a in the extension direction is equal to S/2.

In these optional embodiments, the plurality of dummy traces 220 are distributed side by side at the same edge of the display area AA. Among the near-end dummy electrode blocks 210a and dummy traces 220 positioned at opposite sides of the same edge of the display area, the dummy trace 220 next to the display area AA are closer to the near-end dummy electrode blocks 210a than the other dummy traces 220. When a distance d1 between an end of the one of the plurality of dummy traces 220 that is next to the display area AA and a near-end dummy electrode block 210a is equal to S/2, it can be guaranteed, on one hand, that the distance from the end of the dummy trace 220 to the near-end dummy electrode block 210a is relatively far, and it can be guaranteed, on the other hand, a distance d1 between the end of the dummy trace 220 and either of near-end dummy electrode blocks 210a at both sides of the dummy trace 220 in the extension direction of the edge of the display area is S/2, so as to guarantee that the end of the dummy trace 220 is relatively far from respective near-end dummy electrode blocks 210a. As such, the influence of the static electricity released from the dummy traces 220 on the dummy electrode blocks 210 can be further improved.

In some optional embodiments, as further shown in FIG. 2, ends of two adjacent ones of the dummy traces 220 in the direction away from the display area AA are in an indented arrangement along the extension direction. Mutual influences of the static electricity released from ends of the plurality of dummy traces 220 can be avoided, and the influence of the static electricity released from the dummy traces 220 on the touch-control component 100 can be further improved.

As shown in FIG. 2, ends of two adjacent ones of the dummy traces in the direction away from the display area AA are in an indented arrangement along the second direction Y, and ends of the plurality of dummy traces 220 are all in an indented arrangement along the second direction Y, so as to guarantee that all ends of the plurality of dummy traces 220 that are arranged side by side along the first direction X are not aligned along the second direction Y.

As further shown in FIG. 2, in the direction away from the display area AA, the ends of the plurality of dummy traces 220 may be in an indented arrangement upward along the second direction Y. Alternatively, in other embodiments, in the direction away from the display area AA, the ends of the plurality of dummy traces 220 may be in an indented arrangement downward along the second direction Y.

Optionally, when there are multiple virtual traces 220, distances in the extension direction between ends of the plurality of dummy traces 220 arranged side by side in the direction away from the display area AA and the near-end dummy electrode blocks 210a range from S/3 to 2S/3. As such, an end of each dummy trace 220 is relatively far from the near-end dummy electrode blocks 210a, and it can be guaranteed that a distance from an end of each dummy trace 220 to each near-end dummy electrode block 210a is greater than or equal to S/3. The influence of the static electricity released from the dummy traces 220 on the dummy electrode blocks 210 can be further improved.

As further shown in FIG. 2, for example, the minimum distance and maximum distance from the plurality of dummy traces 220 arranged side by side in the direction away from the display area AA to the near-end dummy electrode blocks 210a in the extension direction are d2 and d3, respectively, and both d2 and d3 are in the range of S/3-2S/3.

Figure 3:
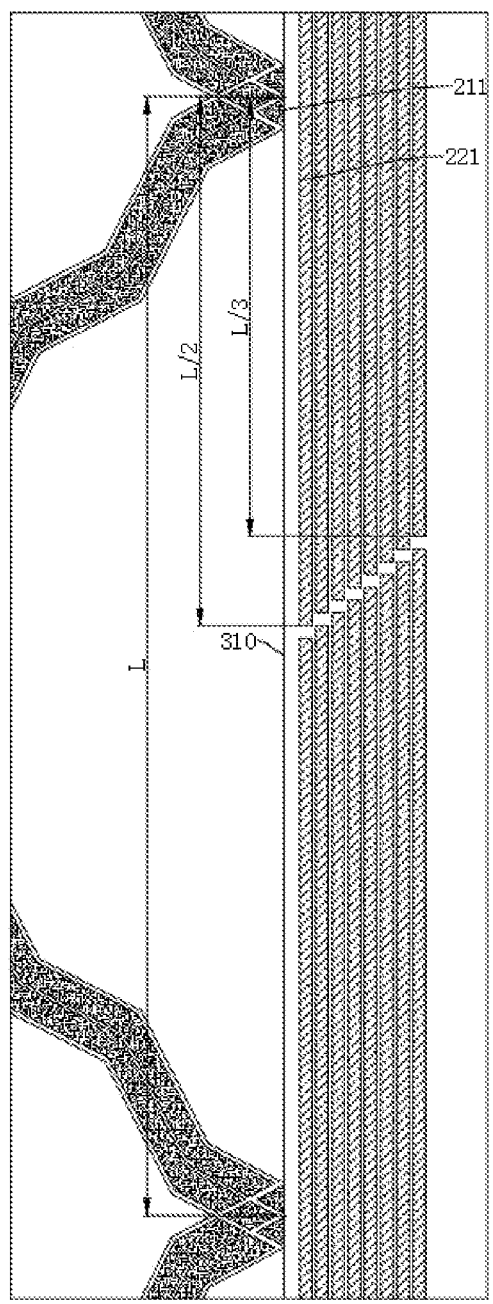
FIG. 3 is a partial enlarged view of the schematic structural diagram of FIG. 2.

Please refer to FIGS. 1-FIG. 3 jointly. FIG. 3 is a partial enlarged view of the schematic structural diagram of FIG. 2.

In some optional embodiments, as shown in FIGS. 1-3, the display area AA may include a first edge 310 extending along the second direction Y, and the dummy electrode blocks 210 may include first dummy electrode blocks 211 adjacent to the first edge 310. The first distance S may include a first linear distance L between two adjacent first dummy electrode blocks 211 in the second direction Y; the dummy traces 220 may include first dummy traces 221 positioned at a side of the first edge 310 facing the non-display area NA, and a distance from an end of at least one of the first dummy traces 221 to a first dummy electrode block 211 in the second direction Y is greater than or equal to L/3.

In these optional embodiments, the first dummy electrode blocks 211 and the first dummy traces 221 are positioned on opposite sides of the first edge 310, and the first dummy traces 221 are closer to the first dummy electrode blocks 211 than dummy traces 220 adjacent to other edges, i.e., a distance from an end of at least one of the first dummy traces 221 that are closer to the first dummy electrode blocks 211 to a first dummy electrode block 211 in the second direction Y is greater than or equal to L/3. As such, the influence of the static electricity released from the dummy traces 220 on the dummy electrode blocks 210 can be further improved.

A value of the first linear distance L may be selected by a user based on actual demand. Optionally, a value of the first linear distance L may range from 3 mm to 7 mm.

Optionally, the first linear distance L may be a distance between two adjacent first dummy electrode blocks 211 along the extension direction of the first edge 310. The first dummy traces 221 may be formed extendedly along the extension direction of the first edge 310. For two adjacent first dummy electrode blocks 211, when a distance from an end of a first dummy trace 221 to one of the two adjacent first dummy electrode blocks 211 is greater than or equal to L/3, a distance from the end of the first dummy trace 221 to the other one is less than or equal to 2L/3. Optionally, a distance from an end of a first dummy trace 221 to a first dummy electrode block 211 may range from L/3 to 2L/3, in order to guarantee that a distance from an end of a first dummy trace 221 to any first dummy electrode block 211 is greater than or equal to L/3.

Optionally, a plurality of first dummy traces 221 may be arranged side by side along a direction away from the first edge 310, i.e., the plurality of first dummy traces 221 may be arranged side by side along the second direction Y. A distance from an end of the one of the plurality of first dummy traces 221 that is next to the first edge 310 and a first dummy electrode block 211 in the second direction Y is equal to L/2, so that a distance from the end of the f first dummy traces 221 to either of two adjacent first dummy electrode blocks 211 is L/2. As such, the end of the first dummy trace 221 is relatively far from both of the two adjacent first dummy electrode blocks 211. The influence of the static electricity released from the dummy traces 220 on the dummy electrode blocks 210 can be further improved.

Optionally, ends of the plurality of first dummy traces 221 arranged side by side may be in an indented arrangement along the second direction Y, to prevent static electricity released from the ends of the plurality of first dummy traces 221 from influencing mutually and being accumulated.

As shown in FIG. 3, ends of the two adjacent first dummy traces 221 in the direction away from the display area AA are in an indented arrangement along the second direction Y, and ends of the plurality of first dummy traces 221 are all in an indented arrangement along the second direction Y, so as to guarantee that all ends of the plurality of first dummy traces 221 arranged side by side along the first direction X are not aligned along the second direction Y.

As further shown in FIG. 3, in the direction away from the display area AA, the ends of the plurality of first dummy traces 221 may be in an indented arrangement upward along the second direction Y. Alternatively, in other embodiments, in the direction away from the display area AA, the ends of the plurality of first dummy traces 221 may be in an indented arrangement downward along the second direction Y.

Figure 4:
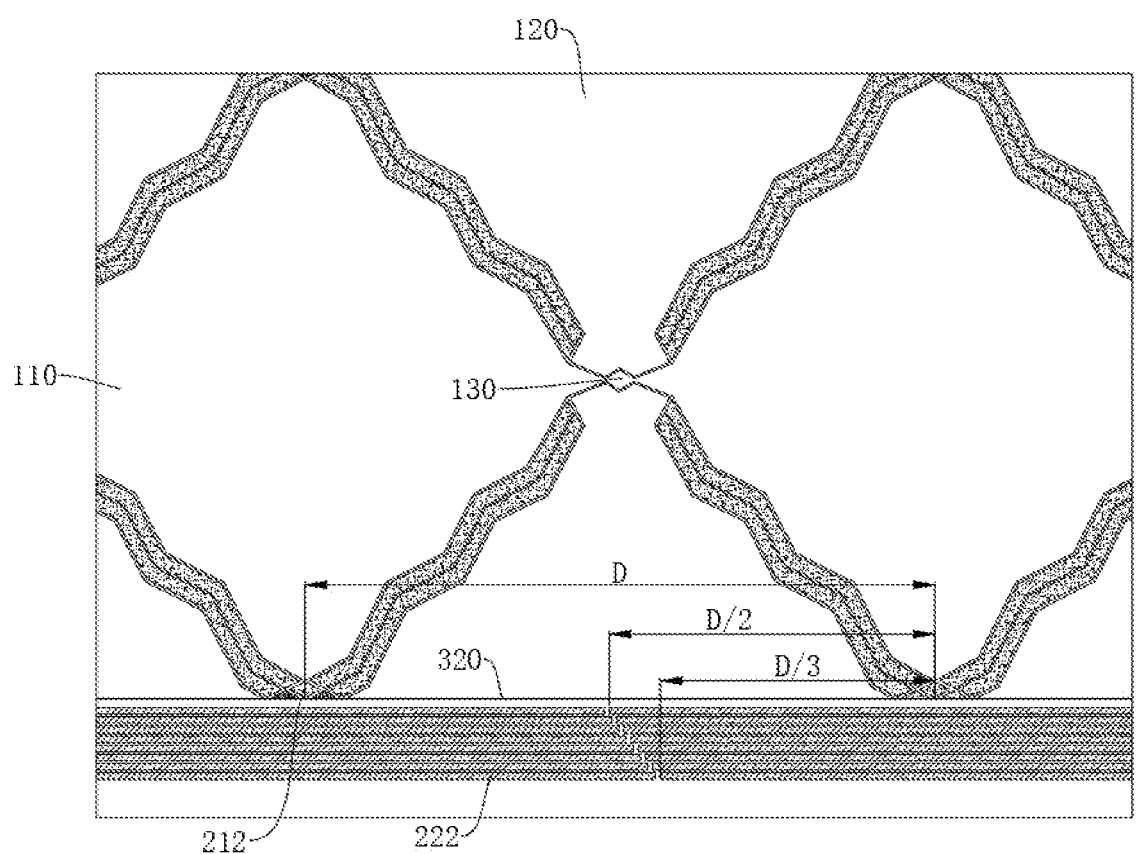
FIG. 4 is an enlarged schematic structural diagram of a portion II of FIG. 1.

Please refer to FIG. 1 and FIG. 4 jointly. FIG. 4 is an enlarged schematic structural diagram of a portion II of FIG. 1.

In some optional embodiments, as shown in FIG. 1 and FIG. 4, the display area AA may include a second edge 320 extending along the first direction X, and the dummy electrode blocks 210 may include second dummy electrode blocks adjacent to the second edge 320. The first distance S may include a second linear distance D between two adjacent second dummy electrode blocks 212 in the first direction X; the dummy traces 220 may include second dummy traces 222 positioned at a side of the second edge 320 facing the non-display area NA, and a distance from an end of at least one of the second dummy traces 222 to a second dummy electrode block 212 in the first direction X is greater than or equal to D/3.

In these optional embodiments, the second dummy electrode blocks 212 and the second dummy traces 222 are positioned on opposite sides of the second edge 320, and the second dummy traces 222 are closer to the second dummy electrode blocks 212 than dummy traces 220 adjacent to other edges, i.e., a distance from an end of at least one of the second dummy traces 222 that are closer to the second dummy electrode blocks 212 to a second dummy electrode block 212 in the first direction X is greater than or equal to D/3. As such, the influence of the static electricity released from the dummy traces 220 on the dummy electrode blocks 210 can be further improved.

A value of the second linear distance D may be selected by a user based on actual demand. Optionally, a value of the second linear distance D may range from 3 mm to 7 mm.

Optionally, the second linear distance D may be a distance between two adjacent second dummy electrode blocks 212 along the extension direction of the second edge 320. The second dummy traces 222 may be formed extendedly along the extension direction of the second edge 320. For two adjacent second dummy electrode blocks 212, when a distance from an end of a second dummy trace 222 to one of the two adjacent second dummy electrode blocks 212 is greater than or equal to D/3, a distance from the end of the second dummy trace 222 to the other one is less than or equal to 2D/3. Optionally, a distance from an end of a second dummy trace 222 to a second dummy electrode block 212 may range from D/3 to 2D/3, in order to guarantee that a distance from an end of a second dummy trace 222 to any second dummy electrode block 212 is greater than or equal to D/3.

Optionally, a plurality of second dummy traces 222 may be arranged side by side along a direction away from the second edge 320, i.e., the plurality of second dummy traces 222 are arranged side by side along the first direction X. A distance from an end of the one of the plurality of second dummy traces 222 that is next to the second edge 320 to a second dummy electrode block 212 in the first direction X is equal to D/2, so that a distance from the end of the second dummy trace 222 to either of two adjacent second dummy electrode blocks 212 is D/2. As such, the end of the second dummy traces 222 is relatively far from both of the two adjacent second dummy electrode blocks 212. The influence of the static electricity released from the dummy traces 220 on the dummy electrode blocks 210 can be further improved.

Optionally, ends of the plurality of second dummy traces 222 arranged side by side may be in an indented arrangement along the first direction X, to prevent static electricity released from the ends of the plurality of second dummy traces 222 from influencing mutually and being accumulated.

As shown in FIG. 4, ends of the two adjacent second dummy traces 222 in the direction away from the display area AA are in an indented arrangement along the first direction X, and ends of the plurality of second dummy traces 222 are all in an indented arrangement along the first direction X, so as to guarantee that all ends of the plurality of second virtual traces 222 arranged side by side along the second direction Y are not aligned along the first direction X.

As further shown in FIG. 4, in the direction away from the display area AA, the ends of the plurality of second dummy traces 222 may be in an indented arrangement leftward along the first direction X. Alternatively, in other embodiments, in the direction away from the display area AA, the ends of the plurality of second virtual traces 222 may be in an indented arrangement rightward along the first direction X.

Figure 5:
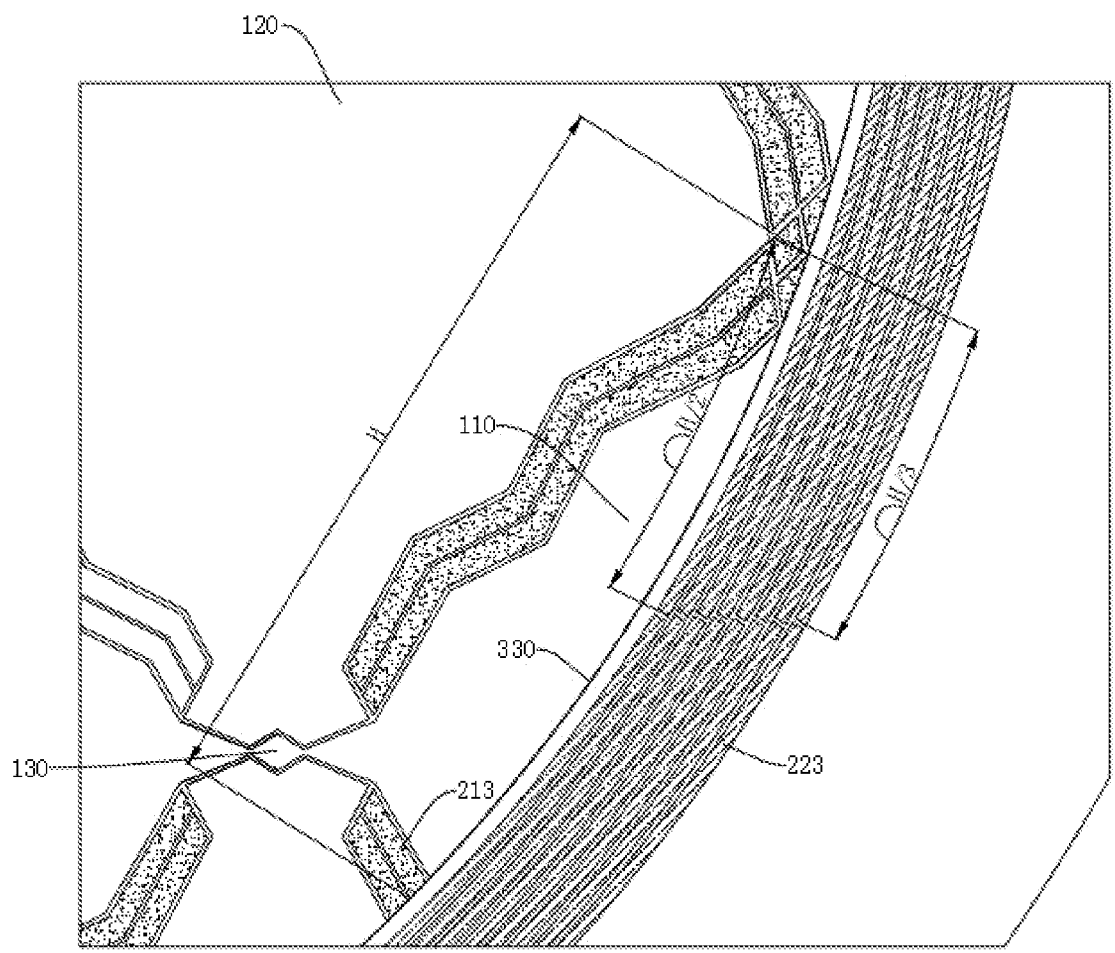
FIG. 5 is an enlarged schematic structural diagram of a portion III of FIG. 1.

Please refer to FIG. 1 and FIG. 5 jointly. FIG. 5 is an enlarged schematic structural diagram of a portion III of FIG. 1.

In some optional embodiments, as shown in FIG. 1 and FIG. 5, the display area AA may include a special-shaped edge 330 connected between the first edge 310 and the second edge 320, and the dummy electrode blocks 210 may include third dummy electrode blocks 213 adjacent to the special-shaped edge 330, and the first distance S may include a third linear distance H between two adjacent third dummy electrode blocks 213; and the dummy traces 220 may include third dummy traces 223 positioned at a side of the special-shaped edge 330 facing the non-display area NA, and a distance from an end of at least one of the third dummy traces 223 to a third dummy electrode block 223 in an extension direction of the special-shaped edge 330 may be greater than or equal to H/3.

In these optional embodiments, the third dummy electrode blocks 213 and the third dummy traces 223 are positioned on opposite sides of the special-shaped edge 330, and the third dummy trace 223 are closer to the third dummy electrode blocks 213 than dummy traces 220 adjacent to other edges, i.e., a distance from an end of at least one of the third dummy traces 223 that are closer to the third dummy electrode blocks 213 to a third dummy electrode block 213 in the extension direction of the special-shaped edge 330 is greater than or equal to H/3. As such, the influence of the static electricity released from the dummy traces 220 on the dummy electrode blocks 210 can be further improved.

A value of the third linear distance H may be selected by a user based on actual demand. Optionally, a value of the third linear distance H may range from 2 mm to 10 mm. For example, the third linear distance H may be 2.1 mm, 2.2 mm, or the like.

Optionally, the third linear distance H may be a distance between two adjacent third dummy electrode blocks 213 along the extension direction of the special-shaped edge 330. The third dummy traces 223 may be formed extendedly along the extension direction of the special-shaped edge 330. For two adjacent third dummy electrode blocks 213 in the extension direction of the special-shaped edge 330, when a distance from an end of a third dummy trace 223 to one of the two adjacent third dummy electrode blocks 213 is greater than or equal to H/3, a distance from the end of the third dummy trace 223 to the other one is less than or equal to 2H/3. Optionally, a distance from an end of a third dummy trace 223 to a third dummy electrode block 213 may range from H/3 to 2H/3, in order to guarantee that a distance from an end of a third dummy trace 223 to any third dummy electrode block 213 is greater than or equal to H/3.

Optionally, a plurality of third dummy traces 223 may be arranged side by side along a direction away from the special-shaped edge 330. A distance from an end of the one of the plurality of third dummy traces 223 that is next to the special-shaped edge 330 to a third dummy electrode block 213 in the extension direction of the special-shaped edge 330 is equal to H/2, so that a distance from the end of the third dummy trace 223 to either of two adjacent third dummy electrode blocks 213 is H/2. As such, the end of the third dummy traces 223 is relatively far from both of the two adjacent third dummy electrode blocks 213. The influence of the static electricity released from the dummy traces 220 on the dummy electrode blocks 210 can be further improved.

Optionally, ends of the plurality of third dummy traces 223 arranged side by side may be in an indented arrangement along the extension direction of the special-shaped edge 330, to prevent static electricity released from the ends of the plurality of third dummy traces 223 from influencing mutually and being accumulated.

Figure 6:
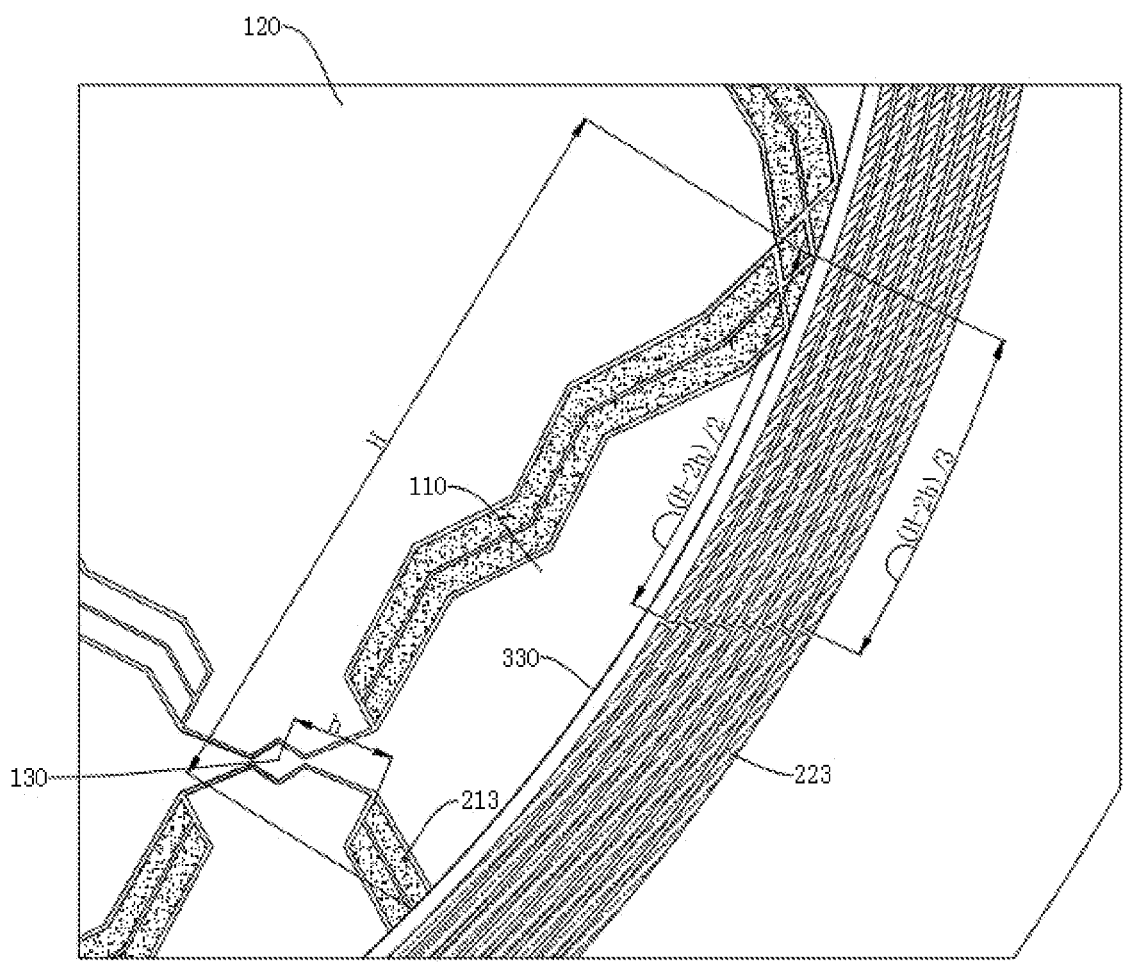
FIG. 6 is an enlarged schematic structural diagram of the portion III of FIG. 1 according to another embodiment.

Please refer to FIG. 5 and FIG. 6 jointly. FIG. 6 is an enlarged schematic structural diagram of the portion III of FIG. 1 according to another embodiment.

In some optional embodiments, as shown in FIG. 5 and FIG. 6, the touch-control component 100 may further include bridge electrodes 130, each of the bridge electrodes 130 may be used to connect two adjacent first electrode blocks 110 or two adjacent second electrode blocks 120, a minimum distance from a bridge electrode 130 to a third dummy electrode block 213 may be h, and the distance from the end of the at least one of the third dummy traces 223 to the third dummy electrode block 213 in the extension direction of the special-shaped edge 330 may be greater than or equal to (H−2h)/3

In these optional embodiments, ends of the third dummy traces 223 are relatively far from the bridge electrodes 130, so as to avoid the influence of static electricity released from the third dummy traces 223 on the bridge electrodes 130, and prevent the static electricity released from the third dummy traces 223 from breaking down the bridge electrodes 130, which will affect the service life of the touch-control component 100.

Optionally, as shown in FIG. 6, a distance from an end of the one of the plurality of third dummy traces 223 that is next to the special-shaped edge 330 to a third dummy electrode block 213 in the extension direction of the special-shaped edge 330 is equal to (H−2h)/2, so that the distance from the end of the third dummy trace 223 to either of two adjacent third dummy electrode blocks 213 is (H−2h)/2. As such, the end of the third dummy trace 223 is relatively far from both of the two adjacent third dummy electrode blocks 213. The influence of the static electricity released from the dummy traces 220 on the dummy electrode blocks 210 can be further improved.

Optionally, ends of the third dummy traces 223 arranged side by side may be in an indented arrangement along the extension direction of the special-shaped edge 330, to prevent static electricity released from the ends of the plurality of third dummy traces 223 from influencing mutually and being accumulated.

Figure 7:
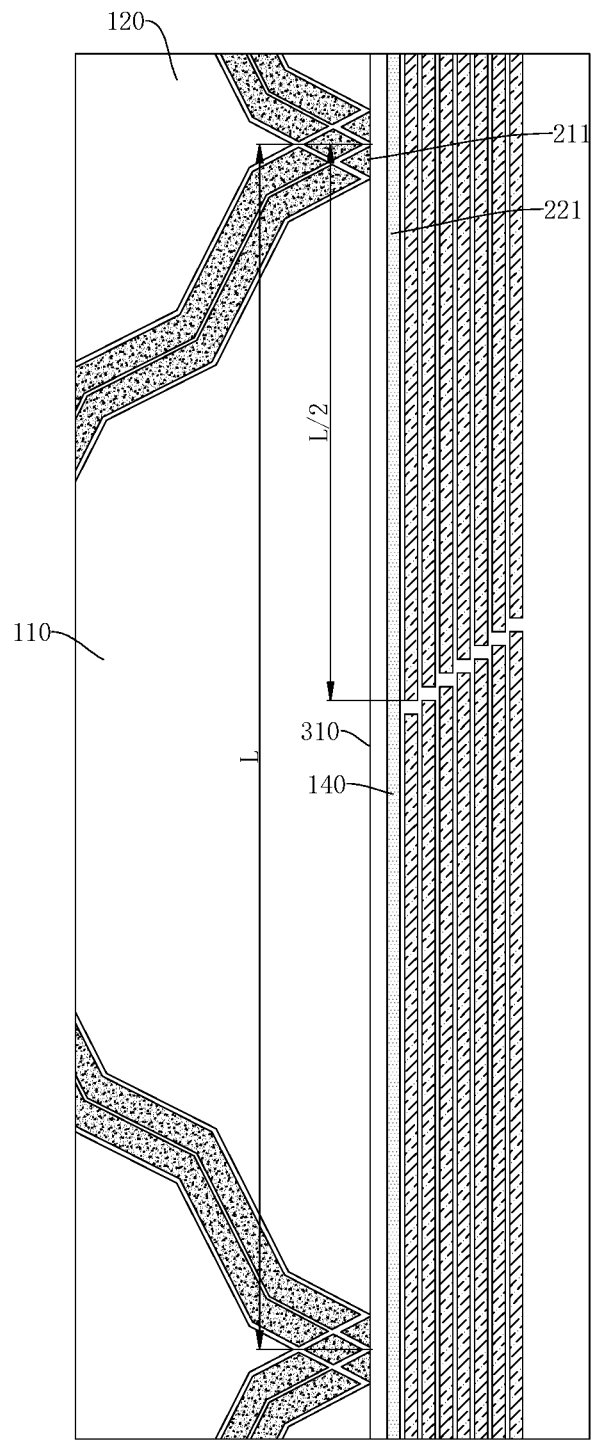
FIG. 7 is an enlarged schematic structural diagram of the portion I of FIG. 1 according to another embodiment.

Please refer to FIG. 1 and FIG. 7. FIG. 7 is an enlarged schematic structural diagram of the portion I of FIG. 1 according to another embodiment.

In some optional embodiments, as shown in FIG. 1 and FIG. 7, the touch-control component 100 may further include touch-control traces 140 positioned in the non-display area NA, and at least one of the touch-control traces 140 may be positioned between the dummy traces 220 and the display area AA. On one hand, a distance from a touch-control trace 140 to the display area AA can be reduced, so as to reduce a trace distance of the touch-control trace 140; and on the other hand, a distance from a dummy trace to the display area AA can be increased, so as to increase a distance from the dummy trace 220 to any dummy electrode block 210. As such, the influence of the static electricity released from the dummy traces 220 on the dummy electrode blocks 210 can be further improved.

Figure 8:
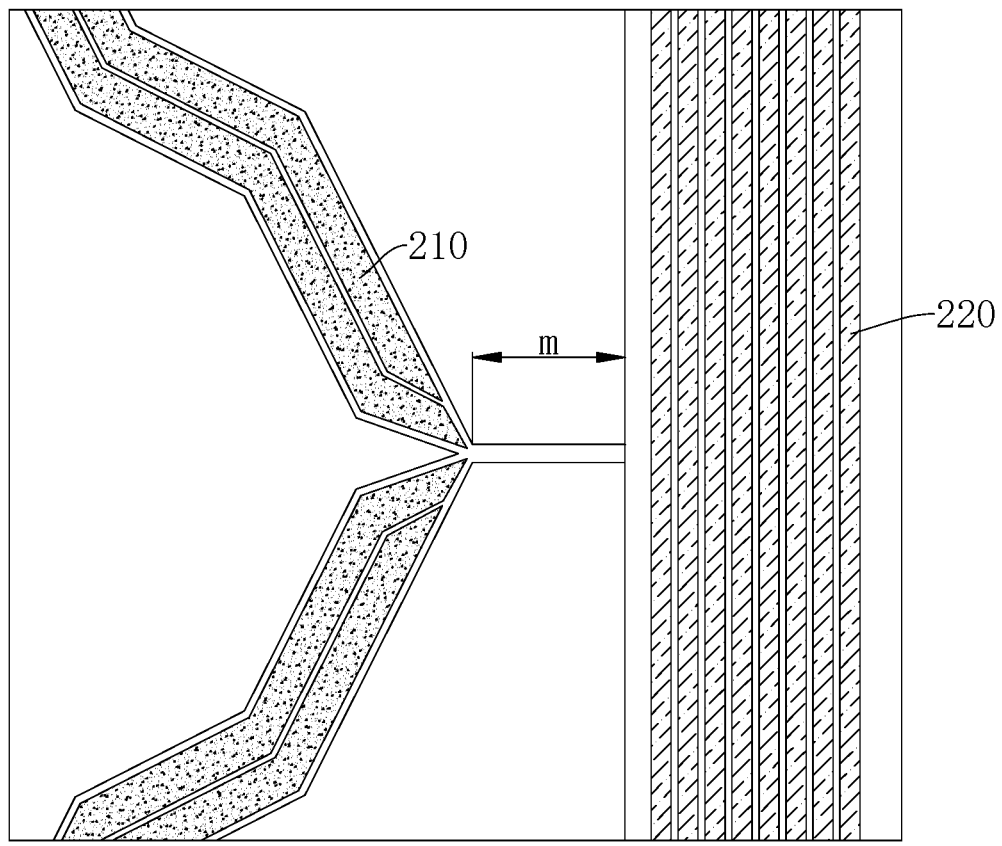
FIG. 8 is an enlarged schematic structural diagram of a portion IV of FIG. 1.

Please refer to FIG. 1 and FIG. 8. FIG. 8 is an enlarged schematic structural diagram of a portion IV of FIG. 1.

In some embodiments, a distance from a dummy electrode block 210 to a dummy trace 220 can be increased by increasing a distance from the dummy electrode block 210 to an edge of the display area. For example, as shown in FIG. 8, a minimum distance m between a dummy electrode block 210 and an edge of the display area may be greater than or equal to S/3, to guarantee a distance from the dummy electrode block 210 to a dummy trace 220 to be greater than or equal to S/3.

In still other embodiments, a distance from a dummy electrode block 210 to an edge of the display area, and a distance from an end of a dummy trace 220 to the dummy electrode block 210 may be adjusted simultaneously, to guarantee a distance from an end of at least one dummy trace 220 to the dummy electrode block 210 to be greater than or equal to S/3.

Figure 9:
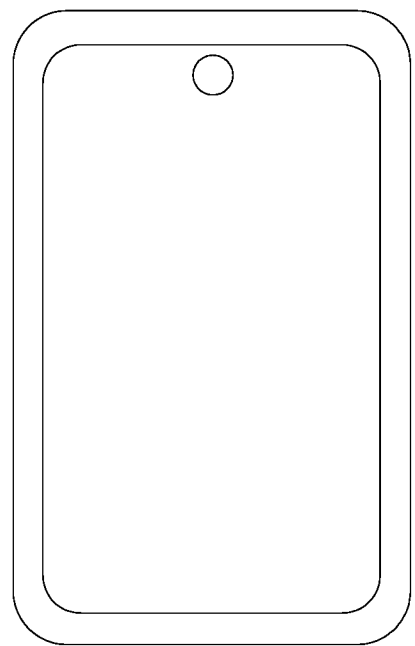
FIG. 9 is a schematic structural diagram of a display device provided by an embodiment of the present application.

As shown in FIG. 9, an embodiment of the second aspect of the present application further provides a display device, including the display panel of any embodiment of the above-mentioned first aspect. Since the display device provided by the embodiment of the second aspect of the present application includes the display panel of any embodiment of the above-mentioned first aspect, the display device provided by the embodiment of the second aspect of the present application can possess the same beneficial effects as the display panel of any embodiment of the above-mentioned first aspect, which will not be repeated here.

The display device in the embodiment of the present application may include but are not limited to a device with a display function, such as, a mobile phone, a Personal Digital Assistant (PDA), a tablet, an e-book, a television, access control, a smart fixed phone, a console, etc.

Although the present application has been described with reference to preferred embodiments, various modifications may be made thereto and its components may be replaced with equivalents without departing from the scope of the present application. Especially, as long as there is no structural conflict, various technical features proposed in various embodiments can be combined in any manner. The present application is not limited to the specific embodiments disclosed herein, instead, and instead can include all technical solutions that fall within the scope of the claims.

What is claimed is:

1. A display panel having a display area and a non-display area, the display panel comprising:
    a touch-control component, comprising a plurality of first electrode blocks distributed in sequence along a first direction, and a plurality of second electrode blocks distributed in sequence along a second direction, the plurality of first electrode blocks and the plurality of second electrode blocks being positioned in the display area; and
    a dummy component, comprising dummy electrode blocks positioned in the display area and dummy traces positioned in the non-display area, each dummy electrode block being positioned between two adjacent first electrode blocks and a second electrode block adjacent to the two adjacent first electrode blocks,
    wherein there is a first distance S between two adjacent dummy electrode blocks, and a distance from an end of at least one of the dummy traces to a dummy electrode block is greater than or equal to S/3,
    wherein the display area comprises a first edge extending along the second direction, a second edge extending along the first direction, and a special-shaped edge connected between the first edge and the second edge, the dummy electrode blocks comprise third dummy electrode blocks adjacent to the special-shaped edge, and the first distance S comprises a third linear distance H between two adjacent third dummy electrode blocks;
    the dummy traces comprise third dummy traces positioned at a side of the special-shaped edge facing the non-display area, an end of each of the third dummy traces is positioned at the side of the special-shaped edge facing the non-display area and between two adjacent third dummy electrode blocks, and a distance from the end of at least one of the third dummy traces to either of the two adjacent third dummy electrode blocks in an extension direction of the special-shaped edge is greater than or equal to H/3.

2. The display panel according to claim 1, wherein the dummy electrode blocks comprise near-end dummy electrode blocks adjacent to an edge of the display area, and the first distance S is a distance between two adjacent near-end dummy electrode blocks.

3. The display panel according to claim 2, wherein at least a part of the dummy traces and the near-end dummy electrode blocks are positioned at opposite sides of a same edge of the display area, and a distance from an end of a dummy trace to a dummy electrode block positioned at opposite sides of the same edge of the display area and in an extension direction of the edge of the display area is greater than or equal to S/3.

4. The display panel according to claim 3, wherein the dummy traces comprise a plurality of dummy traces that are arranged side by side in a direction away from the display area, a distance from an end of the one of the plurality of dummy traces next to the display area to a near-end dummy electrode block in the extension direction is equal to S/2.

5. The display panel according to claim 4, wherein ends of two adjacent ones of the dummy traces in the direction away from the display area are in an indented arrangement along the extension direction.

6. The display panel according to claim 4, wherein distances in the extension direction between ends of the plurality of dummy traces arranged side by side in the direction away from the display area and the near-end dummy electrode blocks range from S/3 to 2S/3.

7. The display panel according to claim 1, wherein
    the display area comprises a first edge extending along the second direction, and the dummy electrode blocks comprise first dummy electrode blocks adjacent to the first edge, and the first distance S comprises a first linear distance L between two adjacent first dummy electrode blocks in the second direction;
    the dummy traces comprise first dummy traces positioned at a side of the first edge facing the non-display area, and a distance from an end of at least one of the first dummy traces to a first dummy electrode block in the second direction is greater than or equal to L/3.

8. The display panel according to claim 1, wherein
    the display area comprises a second edge extending along the first direction, and the dummy electrode blocks comprise second dummy electrode blocks adjacent to the second edge, and the first distance S comprises a second linear distance D between two adjacent second dummy electrode blocks in the first direction;
    the dummy traces comprise second dummy traces positioned at a side of the second edge facing the non-display area, and a distance from an end of at least one of the second dummy traces to a second dummy electrode block in the first direction is greater than or equal to D/3.

9. The display panel according to claim 1, wherein the touch-control component further comprises bridge electrodes, each of the bridge electrodes is used to connect two adjacent first electrode blocks or two adjacent second electrode blocks, a minimum distance from a bridge electrode to a third dummy electrode block is h, and the distance from the end of the at least one of the third dummy traces to either of the two adjacent third dummy electrode block in the extension direction of the special-shaped edge is greater than or equal to (H−2h)/3.

10. The display panel of claim 1, wherein the touch-control component further comprises touch-control traces positioned in the non-display area, and at least one of the touch-control traces is positioned between the dummy traces and the display area.

11. The display panel of claim 1, wherein a minimum distance from a dummy electrode block to an edge of the display area is greater than or equal to S/3.

12. A display device, comprising the display panel according to claim 1.

13. The display device according to claim 12, wherein the dummy electrode blocks comprise near-end dummy electrode blocks adjacent to an edge of the display area, and the first distance S is a distance between two adjacent near-end dummy electrode blocks.

14. The display device according to claim 13, wherein at least a part of the dummy traces and the near-end dummy electrode blocks are positioned at opposite sides of a same edge of the display area, and a distance from an end of a dummy trace to a dummy electrode block positioned at opposite sides of the same edge of the display area and in an extension direction of the edge of the display area is greater than or equal to S/3.

15. The display device according to claim 14, wherein the dummy traces comprise a plurality of dummy traces that are arranged side by side in a direction away from the display area, a distance from an end of the one of the plurality of dummy traces next to the display area to a near-end dummy electrode block in the extension direction is equal to S/2.

16. The display device according to claim 15, wherein ends of two adjacent ones of the dummy traces in the direction away from the display area are in an indented arrangement along the extension direction.

17. The display device according to claim 15, wherein distances in the extension direction between ends of the plurality of dummy traces arranged side by side in the direction away from the display area and the near-end dummy electrode blocks range from S/3 to 2S/3.

18. The display device according to claim 12, wherein
the display area comprises a first edge extending along the second direction, and the dummy electrode blocks comprise first dummy electrode blocks adjacent to the first edge, and the first distance S comprises a first linear distance L between two adjacent first dummy electrode blocks in the second direction;
the dummy traces comprise first dummy traces positioned at a side of the first edge facing the non-display area, and a distance from an end of at least one of the first dummy traces to a first dummy electrode block in the second direction is greater than or equal to L/3.

19. The display device according to claim 12, wherein
the display area comprises a second edge extending along the first direction, and the dummy electrode blocks comprise second dummy electrode blocks adjacent to the second edge, and the first distance S comprises a second linear distance D between two adjacent second dummy electrode blocks in the first direction;
the dummy traces comprise second dummy traces positioned at a side of the second edge facing the non-display area, and a distance from an end of at least one of the second dummy traces to a second dummy electrode block in the first direction is greater than or equal to D/3.

* * * * *